United States Patent
Gleichenhagen et al.

(10) Patent No.: US 6,884,840 B2
(45) Date of Patent: Apr. 26, 2005

(54) PREPARATION OF ACRYLIC HOT-MELT PRESSURE-SENSITIVE ADHESIVES FROM AQUEOUS DISPERSE SYSTEMS

(75) Inventors: Peter Gleichenhagen, Hamburg (DE); Annemarie Müller, Hamburg (DE)

(73) Assignee: tesa AG, Hamburg (DE)

( * ) Notice: Subject to any disclaimer, the term of this patent is extended or adjusted under 35 U.S.C. 154(b) by 290 days.

(21) Appl. No.: 09/814,625

(22) Filed: Mar. 22, 2001

(65) Prior Publication Data

US 2001/0034394 A1 Oct. 25, 2001

(30) Foreign Application Priority Data

Mar. 30, 2000 (DE) .......................................... 100 15 981

(51) Int. Cl.⁷ ........................... C08L 33/02; C08L 33/08
(52) U.S. Cl. .................. 524/832; 252/589; 264/211.12; 522/153; 523/300; 523/340; 524/272; 524/457; 524/458; 524/501; 524/824; 524/828; 524/831; 524/833
(58) Field of Search ............................... 524/457, 458, 524/828, 831, 832, 833, 272, 501, 824, 556, 560; 523/137, 300, 340; 252/589; 264/211.12; 427/208.4; 522/153

(56) References Cited

U.S. PATENT DOCUMENTS

| | | | | |
|---|---|---|---|---|
| 4,130,523 A | * | 12/1978 | Hoy et al. ................... 523/305 |
| 4,424,298 A | * | 1/1984 | Penzel et al. ................ 524/747 |
| 4,780,503 A | * | 10/1988 | Mallya ........................ 524/460 |
| 4,906,421 A | | 3/1990 | Plamthottam ................. 264/22 |
| 5,252,657 A | * | 10/1993 | Frankel et al. ............... 524/460 |
| 5,350,787 A | * | 9/1994 | Aydin et al. ................. 524/162 |
| 5,716,669 A | | 2/1998 | LaRose et al. ........... 427/208.4 |
| 6,040,380 A | * | 3/2000 | Dunaway et al. ........... 524/832 |
| 6,214,925 B1 | * | 4/2001 | Schuler et al. .............. 524/556 |
| 6,228,935 B1 | * | 5/2001 | Dunaway et al. ........... 524/832 |
| 6,254,985 B1 | * | 7/2001 | Gerst et al. ........... 428/355 EN |
| 6,258,888 B1 | * | 7/2001 | Peters et al. ................ 524/522 |
| 6,423,769 B1 | * | 7/2002 | Gerst et al. ................. 524/460 |
| 6,583,252 B2 | * | 6/2003 | Schuler et al. .............. 526/319 |

FOREIGN PATENT DOCUMENTS

| | | |
|---|---|---|
| DE | 2 455 133 | 5/1976 |
| EP | 0 436 159 | 7/1991 |
| EP | 0 621 326 | 10/1994 |

* cited by examiner

*Primary Examiner*—Judy M. Reddick
(74) *Attorney, Agent, or Firm*—Norris McLaughlin & Marcus PA

(57) ABSTRACT

A process for preparing hot-melt pressure-sensitive adhesives from aqueous dispersions based on polyacrylate, and pressure-sensitively adhesive articles produced therefrom, which comprises producing highly concentrated aqueous dispersions with polymer contents between 68% by weight and 87% by weight of gel-free, molecularly-dispersely meltable polymer particles with an at least bimodal size distribution in size ranges between 0.5 μm and 1000 μm Ø.

17 Claims, No Drawings

PREPARATION OF ACRYLIC HOT-MELT PRESSURE-SENSITIVE ADHESIVES FROM AQUEOUS DISPERSE SYSTEMS

SUBJECT OF THE INVENTION

The invention relates to pressure-sensitively adhesive meltable polymers and to mixtures thereof which are produced in aqueous dispersion without the use of solvents and which following removal of the aqueous phase may be coated from the melt and crosslinked. The invention is a continuation of DE 2 455 133.

BACKGROUND OF THE INVENTION

On ecological and economic grounds, a reduction in the use of solvents is increasingly being aimed at for coatings. This also applies to the production of pressure-sensitively adhesive surfaces. For this purpose, two fundamental processes are used, namely film formation by drying of aqueous coatings from dispersions, and film formation from polymer melts.

Both procedures are hampered by disadvantages: in the case of drying of coatings from aqueous dispersions, for instance, the retention of the emulsifier shells is a disrupting factor in the formation of a film from the dispersion particles enveloped by emulsifier. Moreover, during the evaporation of the water phase from the coating, free emulsifier is entrained to the film surfaces together with the water flow, where it accumulates. The former makes these films sensitive to the penetration of moisture, by way of the hydrophilic emulsifier shells that are present and the associated reduction in the internal strength of these coatings through absorption of water. The accumulation of emulsifier on the surface causes a weakening of the film strength at the surface, and hinders the adhesion.

When using synthetic hot-melt pressure-sensitive adhesives (PSAs) it should be borne in mind that by far the predominant method of preparing these polymers is by means of polymerizations in solvents which are subsequently evaporated from the polymer and recovered prior to coating. Accordingly, the solvent recovery during the coating of PSAs in this way is carried out only before the coating stage and is somewhat less complex in design than the method which is still customary at present, namely recovery from the waste air of the drying tunnels. However, the process can by no means be termed free from solvent use, especially since the recovered solvent cannot be used in a closed circuit, owing to instances of contamination by auxiliaries from the polymerization, and instead has to be worked up in between. Examples of this procedure are indicated in the EP application 0 621 326 and in EP 0 436 159.

Examples of the production of pressure-sensitively adhesive coatings with hot-melt PSAs prepared by polymerization in water-based dispersions, in addition to the above-mentioned DE 2 455 133, include U.S. Pat. No. 4,906,421 and U.S. Pat. No. 5,716,669. In these patents, the procedure for removing the water phase by means of specially designed extruder screws, and the subsequent extrusion of the dispersion through a slot die, are described. For this purpose, U.S. Pat. No. 4,906,421 and U.S. Pat. No. 5,716,669 specify an extrusion technique in which the water between the dispersion particles is removed and film formation is achieved by aggregation of the dispersion particles. As regards the composition of the dispersions, all that is given is a listing of a number of common starting materials, and a concentration range of the polymer. Processing by way of the molecularly disperse melt phase, in which the individual polymer chains, as is customary with hot-melt PSAs produced in homogeneous phase, are present displaceably among one another, is not indicated. In DE 2 455 133, cited at the outset, the preparation of molecularly disperse, meltable PSA particles produced in dispersion is described. Stabilizers indicated for the polymerization in dispersion are common water-soluble polymers such as polyvinyl alcohol, while initiators specified are the widely known substances which generate free radicals by thermal cleavage; also described are the substantial quality improvements of the PSA films by crosslinking after filming with high-energy radiation.

In the case of polymer dispersions which are to be used for PSA coatings from the melt, however, the polymer composition, the polymer chain branching, the average chain lengths, and the selection of a functional stabilizer system, able to withstand high thermal stresses, for the polymerization are, for example, of critical influence on the processing properties and the quality of the products produced.

Many of the commercially available PSA dispersions which meet the few criteria mentioned in the abovementioned patents cannot be processed from the melt since, when the water is removed by evaporation, they crosslink rapidly under heat to form infusible polymers and in the extruder can at best be only concentrated, or form film structures which are not molecularly disperse, similar to those of dispersions of dried coatings, with the known disadvantages. Even the polymer dispersions described in DE 2 455 133, whose degree of polymerization has been lowered by means of regulators and which are therefore better suited to melt application, cause difficulties on processing, since, for example, under the high thermal stress the polyvinyl alcohol dispersion stabilizer used gives rise to instances of crosslinking with the polymer and thus impairs the "runnability" of the coating unit, as a result of the formation of crusts and gel specks. This formation of gel from polyvinyl alcohol is initiated by the presence of functional groups, e.g., ester groups, which are present in all (meth)acrylic polymers. Further emulsifier residues which remain adhering to the polymeric dispersion particles, together with residual water, following the removal of the water phase by filtration cause disruptive foaming in the extrusion process.

A further disruptive factor are the microgels which normally form in the case of polymerization in aqueous dispersion, so that by far the predominant number of the commercially available dispersions of PSA polymers cannot be melted, or can be melted only to a more or less small extent, and cannot be extruded, or can be extruded only in a disperse structure. This gel component, dictated by the polymerization mechanism or produced during drying, becomes particularly problematic for defined crosslinking after the formation of a film from the melt. As already described in DE 2 455 133, the crosslinking of hot-melt PSA coatings by high-energy radiation is an elegant process for increasing the film strength (cohesion). Like all free-radical crosslinkings, this one too leads to infusible polymers and must therefore be carried out after the extrusion. Without subsequent crosslinking, hot-melt PSA coatings are low in strength and are therefore of only low quality, owing to the restricted cohesion which is necessary for the formation of a film from the melt. The addition of, for example, a polyunsaturated monomer, which is necessary for crosslinking by electron beams, must be made to the melt prior to extrusion.

For an undisruptive, economic process regime and high quality of the coatings produced it is necessary to avoid all crosslinking factors such as microgel formation, thermally or mechanically initiated gel formation as a result of free-radical crosslinking within the polymer, or by way of the polyunsaturated monomers added, and also crosslinking by way of functional groups within the polymer chains or with the added dispersion stabilizers, which, through the drying and extrusion process, initiate gel formation prior to film formation during the subsequent exposure. Also desirable from an ecological standpoint is a process of preparing these hot-melt PSAs in which the concentration of the polymer in the aqueous phase is as high as possible and the amount of chemical-contaminated water produced is minimized.

As the procedure in accordance with DE 24 55 133 has shown, the polymer particles described therein, which are easy to remove by filtration, can be prepared in dispersion in a concentration range of 20% by weight–approximately 50% by weight. By separating the polymer prior to melting, by means of filtration, a fraction of the disruptive polyvinyl alcohol stabilizer is washed out. The overall amount of chemically contaminated wastewaters produced, however, is considerable. Moreover, the filtration process is costly. Furthermore, several % by weight of adhering water, with emulsifiers and polymeric stabilizer, remain in the filter cake. The aim of the invention is to eliminate or reduce the disruptive factors listed above.

DESCRIPTION OF THE INVENTION

For the polymerization in aqueous dispersion, a preparation process is specified by means of which meltable polyacrylates can be prepared in a concentration range of 68% by weight–87% by weight, and following removal of the water by evaporation, for example, in a heated kneading apparatus under subatmospheric pressure, are formed into a PSA film by way of a slot die with a toothed wheel pump connected upstream. Instead of the kneading apparatus it is also possible to use an extruder having devolatilizing zones and mixing units, or a combination of both processes. The films are in molecularly disperse, uncrosslinked form and correspond substantially in terms of their structure to the high-quality polyacrylate hot-melt PSA films produced from homogeneous phase, e.g., from solution. Preferably, they are subsequently crosslinked by means of high-energy radiation. Despite the high vaporization energy of the water, this process can be made ecologically economic, by means of the high solids concentration of the dispersions, by evaporative removal of the water. The starting materials used include, as principal constituents, water-insoluble (meth)acrylic esters with side-chain lengths from C4 to C14. Alongside these, to a lesser extent, it is possible to use hardening fractions such as (meth)acrylic esters having shorter side chains, or copolymerizable monomers such as vinyl acetate or styrene. In further fractions it is also possible to use (meth)acrylic acid, (meth)acrylamides, or other copolymerizable monomers containing functional groups. In order to suppress the formation of microgel, use is made in particular of free-radically linearly polymerizing initiators which are soluble in organic media and which are dissolved in the monomer phase prior to the polymerization. In order that the melting range of the polymers can be adjusted within a processing range of 100–160° C., the degree of polymerization should be limited by the addition of chain-length regulators. Customary regulators for free-radical polymerizations in dispersion are the alkylthiols, especially dodecanethiol, or tetrabromomethane, which are used for this purpose. Owing to the marked odor nuisance and toxicity, however, these regulators are not used with preference for the hot-melt PSAs of the invention. Preference is given to polymer chain length restrictions brought about by other control mechanisms, such as, for example, the copolymerization of fumaric esters, styrene or vinyl ethers, especially cyclohexenyl ethers, in small amounts which allow the desired degree of polymerization to be set. Also suitable is the addition of small amounts of resins during the polymerization. Hydrophilic resins in particular, such as the strongly acidic rosin acids, exhibit a good regulator activity without destabilizing the dispersion, so that in the presence of approximately 1% by weight–5% by weight of these tackifier resins in the monomer mixture it is possible to prepare gel-free, meltable PSAs in stable dispersion which are free from toxic and intensely odorous regulator residues.

As stabilizers for the polymerization in aqueous dispersion, use is made in particular of combinations of water-soluble polymers with anionic emulsifiers. Water-soluble polymers which may initiate thermal crosslinking in the melt of the polyacrylates with their functional groups, as is possible in the case, for example, of carboxyl groups and hydroxyl groups, are unsuitable for this purpose. Polymers which have established themselves include polyacrylamides and other water-soluble polymers with amide functions, such as polyvinylpyrrolidone, for example. The degrees of polymerization of these stabilizers are preferably set low, since high degrees of polymerization promote gel formation under thermal stress.

As anionic emulsifiers, the common alkylsulfonic salts, as commonly used for the emulsion polymerization of the acrylic derivatives, are of only limited suitability. Of high suitability are, for example, water-soluble salts of sulfated oleic acid derivatives, such as the Na salt of sulfated oleic acid dibutylamide, whose use gives rise to stable, low-foam dispersions from which the water can be removed by evaporation without severe foaming. For further stabilization of the dispersions it is possible in particular to make additional use of nonionic emulsifiers in the case where tackifier resins are used as regulators.

The particle size distribution of the polyacrylate dispersions prepared with the abovementioned initiators, regulators, stabilizers and emulsifiers is at least bimodal. Besides a bead polymer with particle diameters in the range of approximately 10 $\mu$m–200 $\mu$m there is an emulsion polymer having particle diameters in the range of approximately 0.1 $\mu$m–2 $\mu$m. The quantitative distribution between these ranges, and the particle sizes within the ranges, may be controlled by means of the quality of the stabilizers and emulsifiers and their proportions. In this way it is possible to polymerize solids concentrations up into the range 68% by weight–87% by weight into the dispersions.

Following evaporation of the water, preferably under subatmospheric pressure in the devolatilizing zones of extruders or in heatable kneading devices, monomeric polyfunctional acrylates of comparatively high molecular weight and correspondingly low vapor pressure are admixed to the polymer prior to the extrusion through a slot die in amounts of 0.1% by weight–7% by weight, by means of suitable mixing elements, and these acrylates, following filming by means of a slot die or rollers, permit sufficient crosslinking of the PSA film with a $\beta$-radiation dose in the range of 10 kGy–80 kGy. Similarly, in order to increase the bond strength, up to 35% by weight of tackifier resins and aging inhibitors may be admixed to the polymer in an amount which does not too greatly restrict the radiation crosslinking.

Furthermore, the adhesion properties of the hot-melt PSAs of the invention may be modified by admixing fillers, such as titanium oxide and other organic or inorganic materials which are customarily—in accordance with the state of the art—in PSA formulations, or plasticizers such as dioctyl phthalate or citric esters, for example. As suitable fiber substances for increasing the cohesion, short fibers (1 mm–3 mm fiber length) of polyesters or celluloses, in amounts of 0.5% by weight–4% by weight based on solids, have proven suitable. These additions may be admixed in dry form in the dispersions or may be incorporated into the melt following the removal of the water by means of mixing units. Rubberlike fillers may be mixed into the hot-melt PSA dispersions prior to the removal of the water in amounts of up to about 70% by weight in the form, for example, of natural rubber latex or synthetic rubber dispersions, such as butadiene-styrene latices, etc. If instances of agglomeration occur in this case owing to incompatibility, this can be eliminated by neutralization or the setting of a weakly basic pH of the hot-melt PSA dispersions, using ammonia or basic buffer media. The inventive production of PSA films on the basis of (meth)acrylates is based, in accordance with the preceding remarks, on the following process steps:

1. Preparation of Pressure-sensitively Adhesive, Crosslinking-free, Meltable Polyacrylates in Highly Concentrated Aqueous Dispersion.

Composition of the Monomeric Starting Materials:

99.5% by weight (meth)acrylic esters with ester residues of C4–C12, individually or in a mixture, 0.1% by weight–10% by weight (meth)acrylic acid and also hardening monomers, such as (meth)acrylic esters with C1–C3, styrene or vinyl acetate in fractions of up to 40% by weight. In addition, further copolymeric monomers with functional groups such as amide groups or nitrile groups may be present.

Composition of the Stabilizers:

Dispersion stabilizers are used comprising water-soluble polymers, preferably polyvinylpyrrolidone, in amounts of 0.1% by weight–4% by weight, anionic emulsifiers, 0.05% by weight–2% by weight, and nonionic emulsifiers, up to 4% by weight based on the monomers, individually or preferably in a mixture, in a total amount of up to 4% by weight based on monomers.

Polymerization Procedure:

A seed phase is prepared which contains 20% by weight–50% by weight of monomers and the entire aqueous phase with stabilizers. The initiator is dissolved in an amount of 0.1% by weight–0.8% by weight, based on the overall monomer phase, in the monomers of the starting phase. The regulator and the corresponding comonomers are likewise dissolved in the monomer phase of the seed phase, in an amount of 0.2% by weight–20% by weight, based on the overall monomer amount. Subsequently, the polymerization is conducted under the conditions customary for polymerizations in aqueous dispersion and, after the formation of the polymeric seed phase, the further monomers are metered in until a polymer concentration of up to 87% by weight is reached in the aqueous dispersion, and the residual monomer content has fallen to below 0.5% by weight based on polymer. During the metered addition of the monomers it has proven advantageous to meter hardening monomers, such as styrene, for example, at least in fractions, separately from the monomer mixture and, by so doing, to graft them on in the form of side chains. This improves the rheology of the melt. In addition to this procedure, it is also possible to disperse the entire monomer amount and the regulator in the aqueous phase with the stabilizers and, with the metered addition of the initiator, to produce a seed phase into which further monomer dispersion is metered. The polymerization proceeds in the temperature range between about 50° C. and 95° C. over the course of about 4–10 h. Depending on the reaction regime, the initiator concentration, and the regulator content, relative viscosities (25.00° C.) in toluene solutions of the dried polymer in the range of 1 400–5 600 are established.

Depending on reaction regime and stabilizer system, the particle sizes may be distributed over a plurality of ranges from about 1 μm Ø to about 1 mm Ø.

2. Preparation of the PSA Films.

Removal of the Aqueous Phase:

The removal of the water by evaporation takes place either in twin-screw extruders with subatmospheric-pressure devolatilizing sections or in heatable kneading devices with subatmospheric-pressure devolatilizing in accordance with the prior art. This may be preceded by partial concentration of the dispersions in stripping or kneading units with subatmospheric-pressure devolatilization.

Admixture of Tackifier Resins, Fillers and Crosslinking Constituents:

The tackifier resin granules and fillers (see above) may be incorporated into the polymer in mixing zones of the extruder or as dispersions. The tackifier resin fractions may amount to up to 40% by weight based on solids, preferably 10% by weight–30% by weight. The addition of tackifier resin dispersions to the aqueous system, although possible, is not preferred, owing to the associated increase in the fraction of water and stabilizer auxiliaries, and also increased raw-materials costs. Additions of plasticizers to increase the tack or to improve the processing properties are likewise possible.

The polyfunctional (meth)acrylates which are promotive of radiation crosslinking, such as trimethylolpropane triacrylate or polypropylene glycol diacrylate, for example, are incorporated into the polymer, like the resin fractions, in mixing sections of the extruders, following removal of the principal water fraction. The same applies to sensitizers for the UV crosslinking, if not already incorporated into the polymer during the polymerization in the form of copolymerizable photoinitiators.

Film Formation and Radiation Crosslinking:

For film formation, extrusion through a slot die with a toothed wheel pump upstream is preferred. The temperature of the melt is preferably in the range 120° C.–140° C. In order to reduce the film thickness, a drawing zone may be positioned downstream. Film forming via a roll nip with metered extrusion upstream is likewise possible in accordance with the existing state of the art. Residues of water may be removed from the film thermally or by means of high-frequency dryers or microwave dryers. The radiation crosslinking takes place, if necessary, in accordance with the state of the art by means of UV radiation in the range of approximately 2 $J/cm^2$–10 $J/cm^2$ absorption or 10 kGy–100 kGy electron beams. The gel fraction (fraction of the solids which is insoluble in toluene (20° C.)) following radiation crosslinking is between about 10% by weight and 80% by weight. In exceptional cases, where no higher cohesiveness of the PSA films is required for the intended application, crosslinking and the auxiliaries required for the purpose may be omitted.

In accordance with the state of the art, for the processing of hot-melt PSAs, it is possible to produce punched elements or tapes which are adhesive on one or both sides.

In the following text, the invention is illustrated using examples.

Experimental Section

EXAMPLE 1

The dispersion is polymerized in a 2.5 L glass apparatus equipped with anchor stirrer, thermometer, reflux condenser, nitrogen inlet tube and metering vessel.

To prepare the seed phase, 66.82 g of 2-ethylhexyl acrylate, 66.82 g of n-butyl acrylate, 5.72 g of methyl methacrylate and 2.14 g of methacrylic acid, and also 18.5 g of an acidic tackifier resin (Resin 731 D SZ 156 from Abieta) and 5.1 g of an azo initiator (Vazo 67 from Du Pont) are mixed to form a clear solution and dispersed in 150 g of water (deionized) containing 4.2 g of anionic emulsifier (Lutensit AFK from BASF), 8.2 g of nonionic emulsifier (Lutensol AT 50 from BASF) and 8.5 g of water-soluble polymeric stabilizer (Kollidon 25 from BASF).

After the batch has been rendered inert by flushing with nitrogen, the seed phase is initiated at 67° C. and is polymerized over the course of 20 minutes in a temperature range of 67° C.–76° C. Thereafter, a monomer mixture of 330.54 g of n-butyl acrylate, 330.54 g of 2-ethylhexyl acrylate, 28.28 g of methyl methacrylate and 10.57 g of methacrylic acid is metered into the polymerizing mixture over the course of 80 minutes at a reaction temperature of 72° C. After a reaction time of 6 h, the polymer dispersion obtained is cooled to RT.

The polymer content is 84.5% by weight.

The residual monomer content is 0.8% by weight, based on solids.

The particle size distribution is in a range of 12 μm–50 μm Ø, which amounts to approximately 70% by weight of the polymer, the principal fraction in this range being approximately 15 μm Ø. The residual polymer fraction lies within a particle size range between about 0.5 μm–5 μm Ø.

The dispersion is dewatered in a 3 L vacuum-type laboratory kneading apparatus equipped with Sigma blades, condensation trap and vacuum pump. To start with, with kneading of the paste-like dispersion, a temperature of 90° C. and a subatmospheric pressure of 200 mbar are set, which over the course of 25 minutes are increased to 150° C. and 50 mbar subatmospheric pressure. The result is a water-clear, virtually colorless, homogeneous, molecularly disperse melt.

A water-clear, gel-free solution is prepared from 0.5 g of the dewatered polymer in 50 ml of toluene, and the relative viscosity of this solution is measured. It is 2.533 at 25° C.

By means of the conveying pressure of a toothed wheel pump, the melt is formed in a slot die (80 mm width) at 140° C. to give a film of 50 μm in thickness and this film is anchored on a Mylar film (27 μm) which has been treated with adhesion promoter.

The adhesion values are tested by means of adhesive bonds on sanded steel plates (V4A-grade steel, abrasive grade 240).

Bond strength 180° peel angle 300 mm/min: 12 N/cm with cohesive fracture of the PSA film.

Failure time at 23° C., bond area 13×20 mm²:3 min with cohesive fracture of the PSA film.

EXAMPLE 2

A hot-melt PSA dispersion is prepared as described in example 1. Following the removal of the water, 1% by weight, based on polymer, of polyethylene glycol 600 diacrylate (from Cray Valley), 9% by weight based on polymer of the glycerol ester of a hydrogenated rosin (Foral 85, from Hercules) and 18% by weight of an aromatic hydrocarbon resin (Norsolene M 1080, from Cray Valley) are admixed to the melt in the kneading device. Subsequently, the melt is processed to form an adhesive tape specimen, as described in example 1. Subsequently, the PSA layer is crosslinked through the film with 70 kGy of electron beams.

Adhesive values:

Bond strength (see above): 5.5 N/cm without cohesive fracture

Failure time (see above): 950 min with cohesive fracture

What is claimed is:

1. A process for preparing a hot-melt pressure sensitive adhesive comprising polymerizing polyacrylate precursor monomers in an aqueous dispersion to yield a concentrated aqueous dispersion comprising between 68% and 87% by weight of the concentrated aqueous dispersion of gel-free, molecularly-dispersed, meltable polyacrylate particles having an at least bimodal size distribution in the range between 0.5 μm and 1000 μm, and dewatering the concentrated aqueous dispersion under subatmospheric pressure during kneading and/or extrusion.

2. The process according to claim 1, wherein the monomers comprise:

a) 60–99.5% by weight, based on the total weight of monomers, of (meth)acrylic esters $C_4$–$C_{12}$ ester radicals;

b) 0–10% by weight, based on the total weight of monomers, of (meth)acrylic acid or methacrylamide, and c) up to 40% by weight, based on the total weight of monomers, of one or more hardening monomers.

3. The process according to claim 2, wherein the one or more hardening monomers are selected from the group consisting of (meth)acrylic $C_1$–$C_3$ esters, vinyl $C_1$–$C_3$ esters, styrene and other copolymerizable monomers having functional groups of thermal stability sufficient to survive the process.

4. The process according to claim 1, wherein the polymerizing polyacrylate precursor monomers in aqueous dispersion is conducted in the presence of one or more stabilizers present in said aqueous dispersion in a concentration of up to 4% by weight based on the total weight of the aqueous dispersion, and the one or more stabilizers are selected from the group consisting of water-soluble substances which are stable at a melting temperature of the polyacrylate and nonionic and anionic low-foam emulsifiers.

5. The process according to claim 4, wherein the water-soluble substances which are stable at a melting temperature of the polyacrylate are selected from the group consisting of short-chain polymers which carry amide groups.

6. The process according to claim 1, wherein the polymerizing polyacrylate precursor monomers in aqueous dispersion is conducted in the presence of one or more polyacrylate chain-length-regulating substances present in amounts of up to 10% by weight based on the weight of the polyacrylate.

7. The process according to claim 6, wherein the one or more polyacrylate chain-length-regulating substances are selected from the group consisting of vinyl ethers, fumaric esters, maleic esters, styrene and hydrophilic resins.

8. The process according to claim 1, wherein the polymerizing polyacrylate precursor monomers in aqueous dispersion is conducted in the presence of one or more linearly polymerizing, water-insoluble initiators which are soluble in the monomers in amounts of up to 1% by weight based on the weight of the monomers.

9. The process according to claim 8, wherein the initiators are azo initiators.

10. The process according to claim 1, wherein the polyacrylate is soluble without gel in an organic solvent and has a relative viscosity at 25° C. in toluene of 1680–5000 and a melting range between 80° C. and 170° C.

11. The process according to claim 1, which further comprises a) dewatering the concentrated aqueous dispersion to form a homogeneous, molecularly-disperse polyacrylate melt, and b) filming the homogeneous, molecularly-disperse polyacrylate melt to form a film by pressing the homogeneous, molecularly-disperse polyacrylate melt through a slot die, and wherein, the homogeneous, molecularly-disperse polyacrylate melt, was polymerized from at least one acrylate monomer comprising an ester group with between 6 and 12 carbon atoms.

12. The process according to claim 11, wherein the concentrated aqueous dispersion in dewatered in a kneading device or extruder having a devolatizing means operating at a temperature between 90–160° C. to form the homogeneous, molecularly-disperse polyacrylate melt, or b) the homogeneous, molecularly-disperse polyacrylate melt is filmed to form a film by pressing the homogeneous, molecularly-disperse polyacrylate melt through a slot die by means of toothed wheel pumps and/or extruder screws.

13. The process according to claim 11, wherein prior to dewatering, one or more natural rubber lattices or synthetic rubber lattices are added to the concentrated aqueous dispersion in amounts of up to 70% by weight based on the polyacrylate, and/or before or after the dewatering, one or more inorganic fillers are added to the concentrated aqueous dispersion in amounts up to 40% by weight based on the polyacrylate and/or one or more polyacrylate-compatible plasticizers are added to the concentrated aqueous dispersion in amounts up to 30% by weight based on the polyacrylate.

14. The process according to claim 11, wherein after dewatering, one or more tackifier resins are added to the concentrated aqueous dispersion in amounts up to 50% by weight based on overall polymer or up to 35% by weight based on the polyacrylate.

15. The process according to claim 14, wherein the one or more tackifier resins are selected from the group consisting of hydrocarbons having aromatic fractions.

16. The process according to claim 11, wherein after dewatering, one or more UV photoinitiators are added to the concentrated aqueous dispersion and/or incorporated into the polyacrylate by copolymerization in amounts of up to 2% by weight of the polyacrylate, and/or one or more polyunsaturated (meth)acrylic monomers are incorporated into the polyacrylate by copolymerization in amounts up to 5% by weight of the polyacrylate, and the film is crosslinked by subjecting the film to 2–10 $J/cm^2$ UV radiation and/or 10–100 kGy electron beams to yield an insoluble of up to 95% by weight of crosslinked acrylic polymer.

17. The process of claim 1, wherein at least one of the polyacrylate precursor monomers comprises an ester group with between 6 and 12 carbon atoms.

* * * * *

UNITED STATES PATENT AND TRADEMARK OFFICE
CERTIFICATE OF CORRECTION

| | | |
|---|---|---|
| PATENT NO. | : 6,884,840 B2 | |
| APPLICATION NO. | : 09/814625 | |
| DATED | : April 26, 2005 | |
| INVENTOR(S) | : Gleichenhagen et al. | |

It is certified that error appears in the above-identified patent and that said Letters Patent is hereby corrected as shown below:

Column 8, Line 20, "esters $C_4$-$C_{12}$ ester" should read -- esters with $C_4$-$C_{12}$ ester --

Column 9, Line 13, "in dewatered in" should read -- is dewatered in --

Signed and Sealed this

Twenty-ninth Day of May, 2007

JON W. DUDAS
*Director of the United States Patent and Trademark Office*